United States Patent [19]

Paul et al.

[11] Patent Number: 5,132,070

[45] Date of Patent: Jul. 21, 1992

[54] PROCESS FOR THE MANUFACTURE OF COMPOSITE PARTS

[76] Inventors: Marlene L. Paul, 23546 San Fernando Rd., #5, Santa Clarita, Calif. 91321; Richard A. Kisel, 1250 S. Orange Blvd., 190 9, Pasadena, Calif. 91105; Joseph P. Hess, 911 Pineview Dr., Westchester, Pa. 19380

[21] Appl. No.: 568,793

[22] Filed: Aug. 17, 1990

[51] Int. Cl.⁵ ............................................ B29C 43/20
[52] U.S. Cl. .................................. 264/258; 264/166; 264/174; 264/324
[58] Field of Search ................ 156/173, 245; 264/323, 264/324, 258, 166, 174

[56] References Cited

U.S. PATENT DOCUMENTS

| | | | |
|---|---|---|---|
| 1,587,462 | 6/1926 | Adams et al. | 264/324 |
| 3,301,930 | 1/1967 | Boggs | 267/137 |
| 4,347,287 | 8/1982 | Lewis et al. | 428/378 |
| 4,451,317 | 5/1984 | Oizumi et al. | 156/324 |
| 4,657,717 | 4/1987 | Cattanach et al. | 264/324 |
| 4,664,731 | 5/1987 | Layden et al. | 156/245 |
| 4,842,667 | 6/1989 | Thorsted, Jr. | 156/245 |
| 4,891,179 | 1/1990 | Peacock et al. | 264/565 |
| 4,992,229 | 2/1991 | Beever | 264/323 |

Primary Examiner—James Lowe

[57] ABSTRACT

The invention is a method of consolidating and forming a composite part having a plurality of principle surfaces, the part made from a preform having a filamentary material in a resin matrix. The method comprising the steps of placing sheets of material on each of the principle surfaces of the preform; clamping a portion of the preform and the sheets of material together in a moveable clamp; and pultruding the preform with the sheets of material on the principle surfaces through a consolidation and forming zone of a die by moving the clamp.

6 Claims, 3 Drawing Sheets

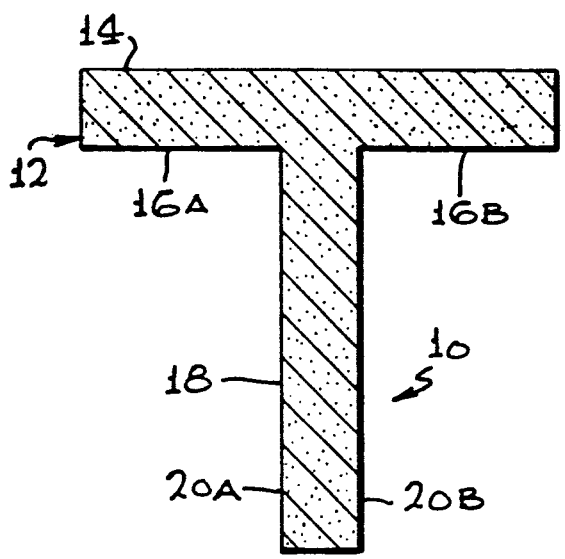
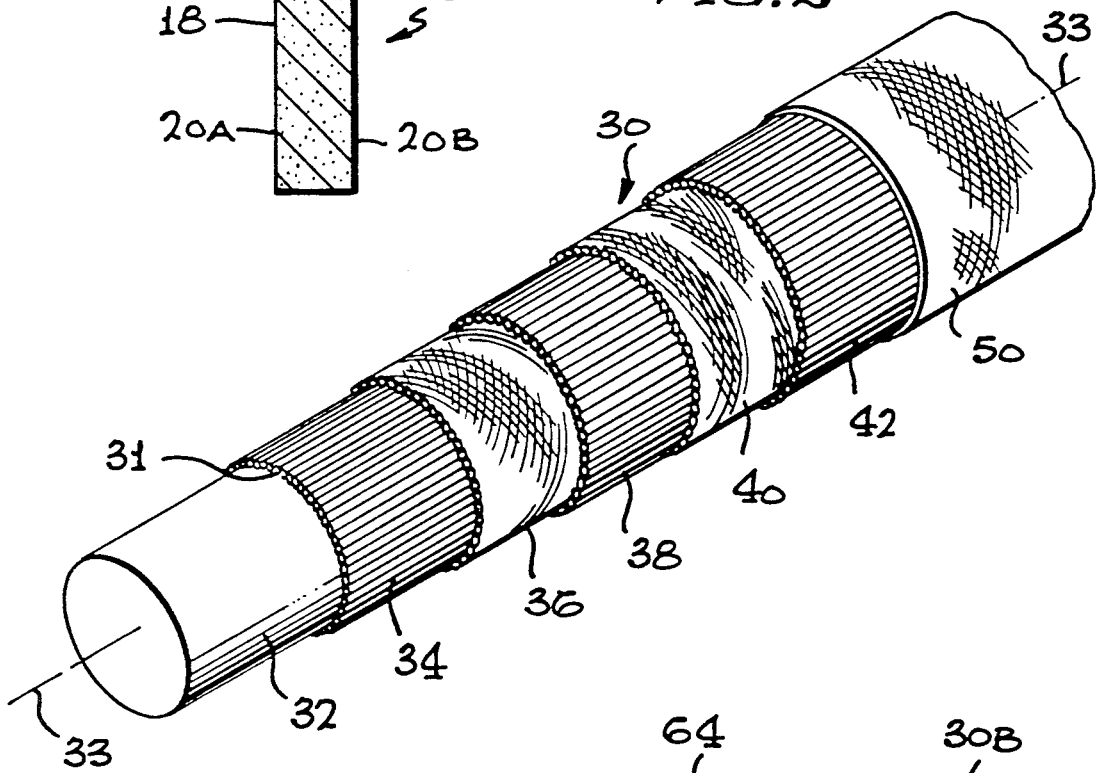
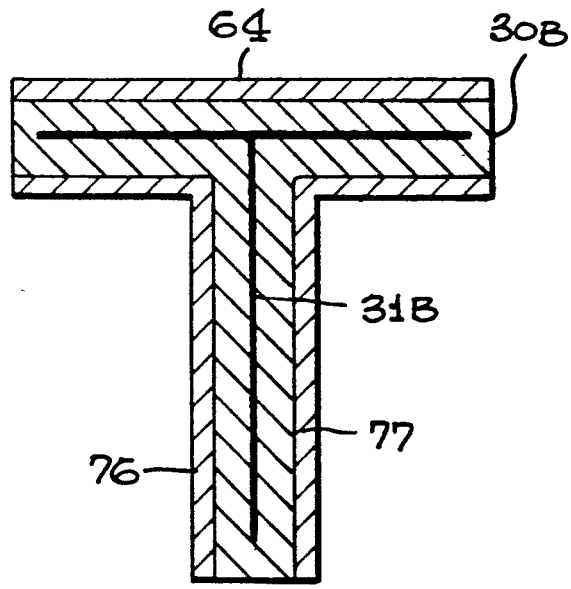

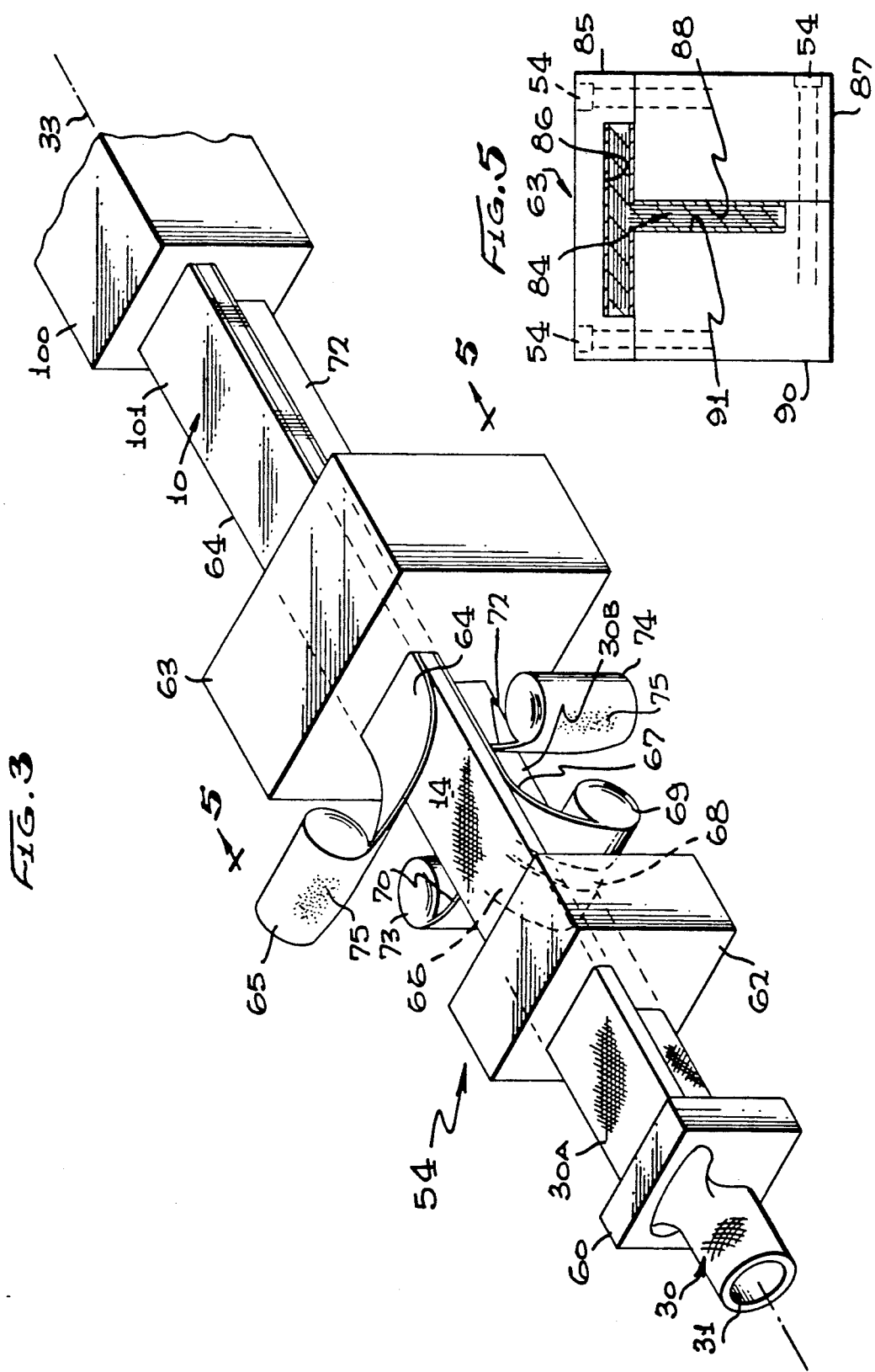

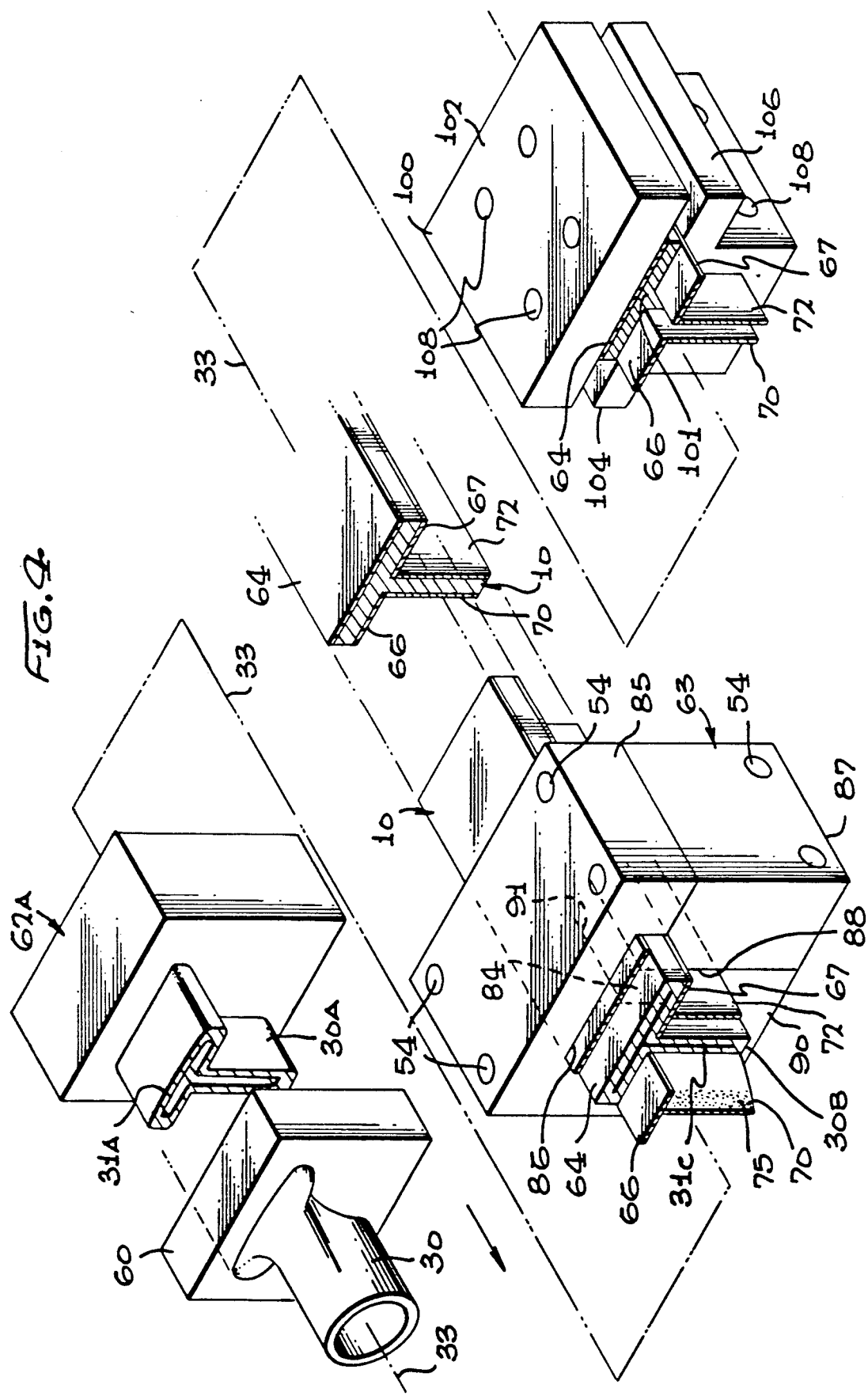

PROCESS FOR THE MANUFACTURE OF COMPOSITE PARTS

BACKGROUND OF THE INVENTION

The U.S. Government has a paid-up license in the invention and the right in limited circumstances, to require the patent owner to license others on reasonable terms as provided for in a U.S. Government contract No. F33315-86-C-5008 awarded by the U.S. Air Force.

TECHNICAL FIELD

The invention relates to the field of the manufacture of composite articles or parts and, in particular, to the manufacture of composite parts by the pultrusion process.

BACKGROUND ART

Composite parts typically consist of filamentary material in a resin matrix. The filamentary material may be unidirectional, or woven, or a combination of both; in fact, most parts are made up of numerous layers of such materials with each layer having a different orientation. The particular orientation of the filamentary material and number of plies will be dictated by the actual design requirements of the part. Typical filamentary materials include: graphite, glass, and KEVLAR. There are two basic types of resins used: thermoset, such as epoxies which cure (undergoes a chemical change) upon heating to forming temperatures, and thermoplastics, such as polyetheretherkeytone, generally called "PEEK", which only melt at their forming temperatures.

The pultrusion process is a simple and cost-effective method of making long, constant, cross-sectional area parts using composite materials. In detail, and in its simplest form, the process involves the "pulling" of resin-impregnated filamentary material through a heated die to simultaneously consolidate and form the impregnated filamentary material as it passes therethrough. A typical process using thermoset resins would begin with the running of numerous strands of filamentary material from individual reels or "tows" through a bath of resin, dissolved in a solvent, and thereafter through a collimating die. The "wetted" filamentary material is then pulled through the die, heated to the curing temperature of the resin, wherein the part is consolidated, formed, and the resin cured prior to exiting the die. Such a method is disclosed in U.S. Pat. No. 3,301,930, "Method of Production of Fiber Reinforced Resin Articles" by L. R. Boggs and U.S. Pat. No. 4,347,287, "Segmented Pultrusions Comprising Continuous Lengths of Fiber Having Selected Areas Along The Lengths Containing Resin Matrix Impregnations" by A. F. Lewis et al. In the latter patent, a method is disclosed for producing a part with cured and uncured segments.

If the part is to be made of numerous layers of filamentary material at various orientations to the "pull" direction (typically designated the X-axis), a "preform" will be necessary. In such cases, the preform is first assembled from tapes or sheets having the desired orientations and passed through the resin bath. Sometimes the preform is assembled from pre-impregnated (often called prepreg) tape, with the tape layers laid up in the proper sequence. Prepreg tape is basically the filamentary material impregnated with the thermoset resin and partially cured to a state wherein it is tacky but easily handled (often called B stage). The preform is pulled through the die, as in the previous example, to form the part. In either case, if the resin is very tacky and/or any of the principle surfaces of the part have filamentary material orientated at large angles to the X-axis, frictional forces will cause the filamentary material in these "off-axis" layers to tend to straighten out and become aligned with the X-axis and/or gather and wrinkle, etc., producing unacceptable parts. In addition, the pull force may become excessive. This problem is solved by prestitching the individual layers of the preform (whether preimpregnated or not) together in a direction perpendicular to the X axis such that the filamentary material orientated along the X axis is used to "pull" the non X axis material through the die. The advantage here is that the preform can still be supplied in rolls so that continuous production can be accomplished. However, while this method works, it requires the time-consuming stitching step.

If the resin is a thermoplastic, the problem of pultruding a preform with off-X-axis filamentary material is even more difficult since, at room temperature, the resin is at full strength and stitching layers of the preform together is all but impossible. In the past, this has limited the off-X-axis orientation of the layers of filamentary material to only a zero angle. Of course, the problem becomes next to impossible when more complex parts, such as "T" cross-sectional parts, are to be manufactured by the pultrusion process. Another approach is to add unidirectional plies over the exterior off-X-axis plies and pultrude an essentially over-sized part. After pultruding, the part is machined to remove the added unidirectional plies. This, of course, is an expensive operation and should be avoided if possible. Thus, what has been needed is a method of pultruding thermoplastic resin matrix preforms that allows large, off-X-axis orientation of the filamentary material.

A system for pultruding tubular composites is disclosed in U.S Pat. No. 4,891,179, "Method of Consolidating composite Articles" by D. G. Peacock, et al. The preform is enclosed in a protective member, for example a glass cloth coated with polytetrafluoroethylene (TEFLON). The cloth can be in the form of half tubes or a flexible type that can be wrapped around the preform. Such a protective member can keep the preform free of longitudinal tension because the Teflon acts as a lubricant preventing the preform from sticking to the die, and the protective member bears the frictional loads. However, the use of conventional composite material having a resin matrix as the protective cover when pultruding high-temperature resin matrix materials, such as PEEK, is impractical. PEEK has a melting temperature in the 700 degree Fahrenheit range (hereinafter referred to as degree F.), well above the useful operating temperature of most other resins. In addition, if the preform is to undergo a large amount of distortion during the pultrusion process, a simple flexible cover will not be adequate.

Thus, it is a primary object of the invention to provide a method of pultruding composite parts.

It is another primary object of the invention to provide a method of pultruding composite parts from preforms which undergo large amounts of deformation during the pultruding process.

It is still another object of the invention to provide a method of pultruding composite parts having a high-melting temperature resin matrix material.

It is a further object of the invention to provide a method of pultruding composite parts having outer plies with large angular variations to the X-axis or pultruding direction.

SUMMARY OF THE INVENTION

The invention is a method of making composite articles or parts from a preform having a filamentary material in a resin matrix and having a plurality of principle surfaces. The method comprising the steps are:
1. Placing sheets of material on the principle surfaces of the part;
2. Clamping a portion of the preform and the sheets of material together in a moveable clamp, and
3. Pultruding the preform with the sheets of material on the principle surfaces through a consolidation and forming zone of a die by moving the clamp.

For example, if a rectangular beam were the composite part in question, the preform would comprise a plurality of laid-up plies of pre-impregnated sheets of filamentary material. The orientation of the filamentary material and number of plies would be dictated by the design requirements. The sheet of material may be made of an organic material such as a high-strength polyimide, but preferably is made of metal. If the sheet is made of metal, the thickness is preferably 0.003 to 0.005 inches thick and would be placed on each principle surface of the preform. The surface in contact with the preform should be coated with a parting agent to insure that it can be easily removed after the step of pultruding. Thus, regardless of the orientation of the filamentary material on the outer plies of the preform to the X-axis, they would be protected by the metal sheets during the actual step of pultruding.

If the composite part is of a more complex shape, such as one having a T-shaped cross-section, then a more complex preform will be necessary as well as additional forming steps such as passing the preform through one or more intermediate forming dies. For example, the preform for the T-shaped part could begin with a circular cross-section, with the individual plies in the form of tightly nested rings. Such a preform is formed on a round mandrel with the individual plies both laid up and braided thereon. These plies could also be either spot welded or ultrasonically welded together to hold them in place once removed from the mandrel. As previously stated, the preform is drawn through one or more dies, some or all of which would be heated so as to make the progressive forming of the circular preform to a "roughly" T-shaped configuration. This "rough" shape must be sufficiently close to the final T-shape so that a metal sheet can be placed on all the principle surfaces of the "T", across the top of both shoulders, on the underside of each shoulder, and on either side of the leg of the "T". This allows the metal sheets to be dispensed from spools or reels. In the fabrication of the T-shaped part, it has also been found that the sheet on the underside of the shoulder can be joined to the sheet on the side of the leg, forming a right-angled corner section. However, such a shape does not allow dispensing from spools but would be useful when pultruding relatively short lengths. No matter what the preliminary steps of the process, the actual step of pultruding the preform into the final shape is conventional in nature. However, the die must be sized somewhat oversize to take into account the thickness of the metal sheets. The actual inlet taper, the length, the material used for the die, etc., will vary from part to part and some trial-and-error experimentation may be necessary.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a cross-sectional view of the part to be produced by the subject pultrusion process which, for purposes of illustration, has a T-shaped cross-section. Also shown are unattached sheets of material placed on each of the principle surfaces of the T-shaped part.

Illustrated in FIG. 5 is a cross-sectional view of a portion of FIG. 4 taken along the line 5—5.

Illustrated in FIG. 2 is a perspective view of the preform used to make the T-shaped cross-sectional part.

Illustrated in FIG. 3 is a perspective view of an apparatus for pultruding the part.

Illustrated in FIG. 4 is a partial exploded perspective view of the preform shown as it passes through the various forming dies as it is molded into the T-shaped cross-sectional part.

Illustrated in FIG. 6 is a part identical to the part shown in FIG. 1 illustrating an alternate design for the sheets.

DESCRIPTION OF BEST MODE OF THE INVENTION

Illustrated in FIG. 1 is a cross-sectional view of the a T-shaped part made of composite materials, generally indicated by numeral 10. The part 10 includes a shoulder portion 12, having a top surface 14, and left- and right-bottom surfaces 16A and 16B, respectively, and a leg portion 18, having left and right sides 20A and 20B, respectively. Illustrated in FIG. 2 is a perspective view of a hollow preform, generally indicated by numeral 30, with an interior 31, mounted on a supporting mandrel 32 and having a longitudinal axis 33, commonly referred to as the X-axis. The preform 30 is composed of a first or inner layer 34 of prepreg material having unidirectional filamentary material at 0 degrees to the X-axis and which is held in place by tacking. Over the inner layer 34 is a layer 36 of braided prepreg having the filamentary material at plus and minus 45 degrees to the X-axis. Over the layer 36 and, in respective order, is another layer of prepreg 38 having unidirectional filamentary material at 0 degrees; a layer 40 of braided prepreg having the filamentary material at plus and minus 85 degrees to the X-axis; another layer 42 of unidirectional filamentary at 0 degrees to the X-axis and, finally, a second layer 50 of braided prepreg having the filamentary material at plus and minus 45 degrees. To hold the layers of the preform in positional relationship to each other, the individual layers of prepreg can be ultrasonically welded together.

Illustrated in FIG. 3 is a perspective view of a pultrusion apparatus 54 for making pultruded parts such as shown in FIG. 1. Illustrated in FIG. 4 is a partial perspective view of the preform shown in FIG. 2 passing through the various forming steps in the apparatus 54. Finally, illustrated in FIG. 5 is a cross-sectional view of FIG. 4 taken along the line 5—5. Referring to FIGS. 3, 4, and 5, in order for a circular preform 30 to be pultruded into the part 10 it must undergo a dramatic change in cross-sectional shape. If the preform incorporates a thermoplastic resin matrix material which would be at its final strength level, it will be stiff and will not readily be deformed. Thus, the preform may have to be passed through several heated dies which progressively deform the preform prior to the final consolidating and forming in the putrusion die. Thus, the apparatus 54 incorporates a first die 60 which only deforms the preform 30 to a very rough approximation of a "T", indicated by numeral 30A; note that the interior, indicated by numeral 31A, is still quite large. The preform 30 is next pulled through a heated die 62 which further deforms the preform to a shape much closer to the shape of the part 10, indicated by numeral 30B; note again, the interior, indicated by numeral 31C, is now almost completely closed.

At this point the preform 30 is ready to be pulled through the final heated consolidating and forming die 63; however, the frictional forces will normally be so high that the layer 50 (best seen in FIG. 2) of the preform is likely to be severely pulled out of shape with the filamentary material tending to align with the X-axis and/or "gather" or "bunch up" causing a wrinkled finish. This will also cause the necessary pultrusion forces to rise to a very high level, which may be above the strength of the filamentary material or of the apparatus itself. To prevent this from happening. Applicants have modified the prior art method of pultruding parts by adding the step of placing sheets of material on all of the principle surfaces of the preform 30 prior to entrance into the final die 63. The material can be a polyimide or other high-strength organic material, which could be reinforced with filamentary material. However, it is preferred that the sheets be made of thin metal, such as stainless, having a thickness of between 0.003 and 0.005 inches. The determination of the actual thickness of the metal sheet that should be used to pultrude any particular part will require some trial-and-error experimentation. In general, however, a more complex cross-sectional shape requires thinner material so that the sheet can conform to the part. On the other hand, the larger the surface area of the principle surfaces of the part, the thicker the sheet must be in order to absorb the loads.

Thus, a metal sheet 64 from a spool 65 is fed onto top surface 14 of the shoulder 12, and metal sheets 66 and 67 from spools 68 and 69, respectively, are fed onto surfaces 16A and 16B of the shoulder 12, and metal sheets 70 and 72 from spools 73 and 74, respectively, are fed onto the surfaces 20A and 20B of the leg portion 18. In order to insure easy removal of the sheets from the completed part, they should be coated with a parting agent 75 on the surfaces contacting the preform. Illustrated in FIG. 6 is an alternate configuration for the sheets. Here, the sheets 66 and 70 and sheets 67 and 72 are replaced with single sheets 76 and 77, respectively, both in the form of flexible, right-angled "brackets". While the sheets 76 and 77 reduce the number of sheets required, they cannot be wound on spools to provide continuous feed.

Referring particularly to FIG. 5, it can be seen that the heated consolidating and forming die 63 having a die cavity 84, is a conventional design but it must be designed to accommodate the metal sheets. However, increasing the size of the die cavity 84 by an amount equal to the increase in thickness caused by the metal sheets is sufficient in most cases. As illustrated, the forming die 63 is in three sections: top section 85 having forming surface 86; right-side section 87 having a forming surface 88, and left-side section 90 having a forming surface 91, all held together by fasteners 54. The three forming surfaces 86, 88, and 91 form the die cavity 84 when the three die sections are fastened together.

Referring now to FIGS. 1-5, the preform 30 is pulled through the various dies by means of a jaw assembly 100. However, it is important at this point to discuss how preform is initially fed through the die cavity 84 and clamped by the jaw assembly 100. The preform 30 is formed so that the end 101 thereof has less than the total number of required layers, such that it can be easily fed by hand through the dies 60, 62, and the die 63 by hand (with the metal sheets installed thereon as it passes through the die 63). It is then attached to the clamp assembly 100. As illustrated, the clamping jaw assembly 100 is composed of three members: a flat top member 102, and two lower right-angled members 104 and 106, all clamped about the reduced end 101 of the preform 30 and sheets 64, 66, 70, and 72 by means of a plurality of fasteners 108. The fasteners 108 pass through holes (not shown) in the members 102, 104, and 106, and in the end 101 of the preform 30.

Thus, in operation, the preform 30 is pulled through the dies 60 and 62 to initially form the preform 30 and, thereafter, through the die 63 by means of the jaw assembly 100. As a portion thereof passes through the die 63, the resin in the preform is melted, consolidated, and formed into the part 10. It must be understood that the main thrust of the invention is the actual clamping of both the preform 30 and sheets by the jaw assembly 100 during the pultrusion process. This protects the exterior layers on the preform, since the pulling loads are absorbed by the sheets and not the preform. A second major thrust of the invention is the use of metal sheets on the principle surfaces of the part during the consolidation and final forming through the forming die 63. Whether or not the preliminary forming steps are necessary will depend on the cross-sectional shape of the part and the type of preform required. For example, a simple, rectangular, cross-sectional part may only require a single die. Finally, while the above example contemplated a part using a thermoplastic resin matrix, the use of thermoset resins is not precluded.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICATION

The invention has application in any industry using composite structures.

We claim:

1. A method of consolidating a composite article into a final shape having a plurality of principle surfaces, the part made from a preform having a filamentary material in a resin matrix, the method comprising the steps of:
    placing sheets of material on the principle surfaces of the preform;

clamping a portion of the preform and said sheets of material together in a moveable clamp; and pultruding the preform with said sheets of material on the principle surfaces through a consolidation and forming zone of a die by moving said clamp wherein heat and pressure consolidate and form said preform into the final shape.

2. The method as set forth in claim 1 wherein said sheets are made of metal.

3. The method as set forth in claim 2 wherein said metal is a stainless steel.

4. The method as set froth in claim 3 wherein the thickness of the said metal sheets are between 0.003 and 0.005 inch thick.

5. The method as set forth in claim 4 wherein in the surfaces of said sheets in contact with the preform are coated with a parting agent.

6. The method as set forth in claim 5 wherein said preform is passed through at least one preliminary forming die prior to the step of pultruding said preform.

* * * * *